United States Patent [19]

Rodway et al.

[11] 3,887,566

[45] June 3, 1975

[54] 2,3-DIHYDROIMIDAZO-ISOQUINOLINES

[75] Inventors: Ronald Ernest Rodway, Bourne End; Ronald Frederick Cookson, Reading, both of England

[73] Assignee: Aspro Nicholas Ltd., Slough, England

[22] Filed: Feb. 29, 1972

[21] Appl. No.: 230,464

[30] Foreign Application Priority Data
Feb. 11, 1971 United Kingdom................. 4457/71

[52] U.S. Cl...... 260/288 R; 260/250 P; 260/250 Q; 260/256.4 F; 260/283 S; 260/286 A; 260/286 Q; 260/286 R; 260/289 R; 424/250; 424/258
[51] Int. Cl.²....................................... C07D 237/26
[58] Field of Search.......................... 260/288, 286 R

[56] References Cited
UNITED STATES PATENTS

| | | | |
|---|---|---|---|
| 3,435,042 | 5/1969 | Drukker........................ | 260/288 R |
| 3,487,087 | 12/1969 | Sarett............................ | 260/288 R |
| 3,624,093 | 11/1971 | Sulkowski..................... | 260/288 R |
| 3,652,570 | 3/1972 | Aittos............................ | 260/288 R |
| 3,668,208 | 1/1972 | Baxter........................... | 260/288 R |

OTHER PUBLICATIONS
Kroehuke et al., Chem. Abstr., Vol. 57, Col. 5889d, (1962).
B. C. Haykovsky, Chem. Abstr. Vol. 72, Col. 121435r, (1970).
Nair et al., Chem. Abstr. Vol. 68, Col. 105102s, (1968).

*Primary Examiner*—Donald G. Daus
*Attorney, Agent, or Firm*—William Anthony Drucker

[57] ABSTRACT

Compounds having anti-inflammatory activity of formula I below have been found to be pharmaceutically active:

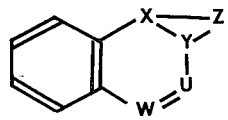

I wherein

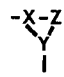

represents a ring of formula IIa or IIb fused to the benzazine nucleus:

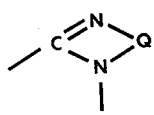 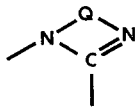

IIa      IIb

Q represents —$CH_2CH_2$—, —$CH_2CH_2CH_2$— or —CH=CH—;
U and W independently represent N or CR but at least one of U and W represents CR;
R represents hydrogen, aryl or a divalent radical joined to the benzazine nucleus to form an aromatic carbocyclic ring structure fused to said nucleus and, where the formula contains two R radicals, those R radicals may be the same or different;

and wherein the polycyclic nucleus and any aryl or divalent radical represented by R optionally are substituted by one or more substituent radicals. The majority of these active compounds are novel. Two novel processes are disclosed for preparing certain of the compounds of formula 1.

6 Claims, No Drawings

2,3-DIHYDROIMIDAZO-ISOQUINOLINES

The present invention relates to certain benzazine (including benzdiazine)/derivatives which have been found to have useful pharmacological properties. In particular the invention provides pharmaceutical compositions containing said benzazine derivatives as active ingredients. Some of the heterocyclic compounds are novel and the invention provides also these novel compounds per se. The invention provides further a novel process for preparing some of the benzazine derivatives.

According to the present invention, there are provided pharmaceutical compositions each of which comprises, in association with a pharmaceutically acceptable carrier or diluent therefor, an active ingredient selected from benzazine derivatives of formula I:

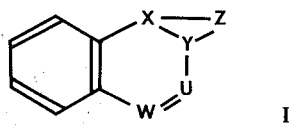

wherein

represents a ring of the formula IIa or IIb fused to the benzazine nucleus:

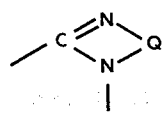   IIa

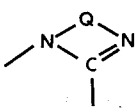   IIb

Q represents —CH$_2$CH$_2$—, —CH$_2$CH$_2$CH$_2$— or —CH=CH—; U and W independently represent N or CR but at least one of U and W represents CR;

R represents hydrogen, aryl or a divalent radical joined to the benzazine nucleus to form an aromatic carbocyclic ring structure fused to said nucleus and, where the formula contains two R groups, those R groups may be the same or different;

and wherein the polycyclic nucleus and any aryl or divalent radical represented by R optionally are substituted by one or more substituent radicals which are "pharmaceutically compatible" with the unsubstituted molecule;

and pharmaceutically acceptable addition salts and quaternary ammonium derivatives thereof.

By pharmaceutically compatible as used in this specification (including the claims thereof) in relation to substituent radicals we means that the presence of the radical(s) neither destroys the pharmacological activity of the unsubstituted molecule nor decreases the therapeutic ratio (i.e. LD$_{50}$:ED$_{50}$) to unity or below. The pharmaceutical compatibility of a particular substituent radical may depend upon the intended site of substitution in the molecule and/or the presence in the molecule of other substituents. Hence a given substituent radical may be pharmaceutically compatible in respect of one molecule into which it is to be introduced but incompatible in respect of another molecule. The compatibility of any radical in respect of any molecule of Formula 1 readily can be assessed by subjecting the substituted compound to standard screening tests such as those referred to hereinafter. It is well within the ability of the average skilled man concerned with the development of new drugs to predict and ascertain which substituent radicals may be present in the compounds of Formula 1.

Examples of substituent radicals which are likely to be pharmaceutically compatible with most, if not all, of the unsubstituted molecules of Formula 1 are alkyl, alkoxy, halogen, halogenoalkyl, hydroxy, hydroxyalkyl, alkylthio, alkylsulphinyl, alkylsulphonyl, amino (including alkylamino and dialkylamino), nitro, alkylsulphonamido (i.e. alkyl-SO$_2$NH—), and sulphamoyl (i.e. H$_2$NSO$_2$—), where each of said alkyl groups contains 1 to 4 carbon atoms.

C$_1$–C$_4$ alkyl radicals are methyl, ethyl, and the various propyl and butyl isomers and the alkoxy and alkylthio substituents are those corresponding to said alkyl radicals. Halogens are chloro, bromo, iodo, and fluoro whilst halogenalkyl substituents include for example 2-bromoethyl, 2-iodoethyl, 2-fluoroethyl, 2-chloropropyl, 3-fluoropropyl and trifluoromethyl. Hydroxyalkyl substituents are exemplified by 2-hydroxyethyl, 3-hydroxypropyl and 4-hydroxybutyl. Amino substituents include for example unsubstituted amino (i.e. NH$_2$), methylamino, ethylamino and dimethylamino. Alkyl-sulphonamido substituents are exemplified by methylsulphonamido.

Examples of radicals represented by R in formula 1 are hydrogen and phenyl, optionally substituted by one or more alkyl, alkoxy, halogen, halogenoalkyl, hydroxy, hydroxyalkyl, alkylthio, alkylsulphinyl or alkylsulphonyl radicals as specified above. When U represents N and W represents CR, R may, for example, represent a divalent radical joined to the benzdiazine nucleus to form an indena-benzdiazine derivative of the formula Iaa:

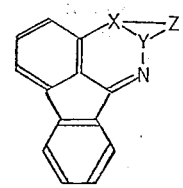   Iaa

Similarly, when U and W both represent CR, the R groups together may, for example, represent a divalent radical joined to the benzazine nucleus to form a derivative of the formula Ibb:

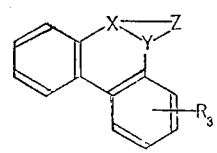   Ibb wherein R$_3$ represents one or more alkyl, alkoxy, halogen, halogenoalkyl or nitro radicals as optional substituents in the benzene ring fused to the said benzazine nucleus. Whenever the term "phenyl" is used in this specification (including the claims thereof) it means the unsubstituted radical C₆H₅- unless accompanied by a specific reference to the optional presence of substituents.

The heterocyclic compounds of formula I have been found to possess valuable pharmacological properties including analgesic, anti-inflammatory, anti-bacterial, anti-viral and/or cardiovascular activity as determined by standard screening techniques. Not all of the compounds possess the same spectrum of activity but generally they can be divided according to their principal activity into two classes. A first-class consists of those compounds which have a therapeutically useful level of anti-inflammatory activity and are of formula I when W represents —CR i.e. compounds of formuale Ia and Ib:

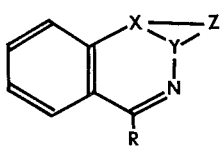

wherein the definitions of formula I apply;

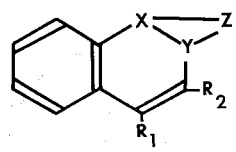

wherein R₁ and R₂ independently represent an R radical and the definitions of formula I apply The other class consists of those compounds which have a therapeutically useful level of cardiovascular activity and are of formula I when W represents N and U represents CR, i.e. compounds of formula Ic:

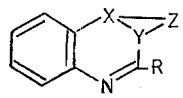

where the definitions of formula I apply.

The screening tests employed to determine antiinflammatory activity were the phenylbenzoquinone abdominal constriction test (as described by Parkes and Pickens in *Brit. J. Pharmacol. Chemother.*, 1964 25 81); the rat paw volume test (modified version of that described by Winter et al in *Proc. Soc. Exp. Biol. Med.* 1962 III 544); and the rat adjuvant arthritis test (modified version of that described by Newbould in *Brit. J. Pharmacol.*, 1963 21 127). The test employed to assess cardiovascular activity was the direct measurement of arterial blood pressure of rats (as described in D'Amour and Blood "Manual for Laboratory Work in Mammalian Physiology", Univ. Chicago Press, 1963).

The compounds of formula Ia include quinazoline derivatives of formula III:

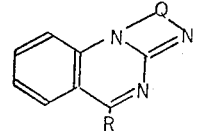

i.e. 1,2-dihydroimidazo[1,2-a]quinazolines of formula IIIa: 1H-2,3-dihydropyrimido[1,2-a]quinazolines of formula IIIb; and imidazo[1,2-a]quinazolines of formula IIIc:

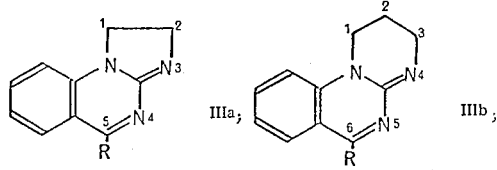

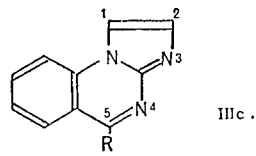

The definitions of formula I apply to the above formulae III

Examples of compounds of formula III are those in which the polycyclic nucleus is unsubstituted except for R and R represents hydrogen or phenyl, i.e.:
1,2-dihydroimidazo[1,2-a]quinazoline (IIIa, R=H);
5-phenyl-1,2-dihydroimidazo[1,2-a]quinazoline (IIIa, R=C₆H₅);
1H-2,3-dihydropyrimido[1,2-a]quinazoline (IIIb, R=H);
6-phenyl-1H-2,3-dihydropyrimido[1,2-a]quinazoline (IIIb, R=C₆H₅);
imidazo[1,2-a]quinazoline (IIIc, R=H); and
5-phenyl-imidazo[1,2-a]quinazoline (IIIc, R=C₆H₅).

The compounds of formula Ia include also phthalazine derivatives of formula IV:

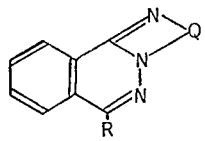

i.e. 2,3-dihydroimidazo[2,1-a]phthalazines, of formula IVa; 2H-3,4-dihydropyrimido[2,1-a]phthalazines of formula IVb; and imidazo[2,1-a]phthalazines of formula IVc:

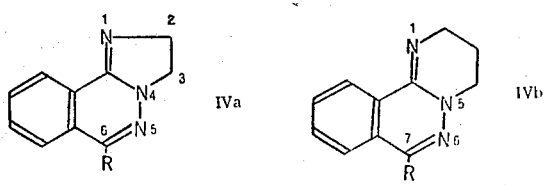

The definitions of formula I apply to the above formulae IV.

Examples of compounds of formula IV are those in which the polycyclic nucleus is unsubstituted except for R and R represents hydrogen, phenyl, optionally substituted by one or more alkyl, halogen or alkoxy radicals, or a divalent radical joined to the phthalazine nucleus to form an indeno[1,2,3-d,e]phthalazine ring structure. Specific examples are:

2,3-dihydroimidazo[2,1-a]phthalazine (IVa, R=H):
6-phenyl-2,3-dihydroimidazo[2,1-a]phthalazine (IVa, R-C₆H₅);
6(p-chlorophenyl)-2,3-dihydroimidazo[2,1-a]phthalazine (IVa, R=

—⟨⟩—Cl);

6(m-chloro-p-methyl-phenyl)-2,3-dihydroimidazo[2,1-a]phthalazine (IVa, R= —⟨⟩—CH₃ );
        |
        Cl 3,4-dihydroimidazo[2,1-a]indeno[1,2,3-d,e]phthalazine (formula

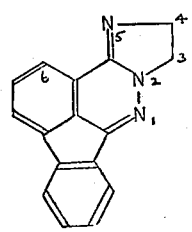

i.e. IVa, R forms residue of a fused indene system);

2H-3,4-dihydropyrimido[2,1-a]phthalazine (IVb,R=H);
7-phenyl-2H-3,4-dihydropyrimido[2,1-a]phthalazine (IVb, R—C₆H₅);
7(p-chlorophenyl)-2H-3,4-dihydropyrimido[2,1-a]phthalizine (IVb, R = —⟨⟩—Cl );

3H-4,5-dihydropyrimido[2,1-a]indeno[1,2,3-d,e]phthalazine;
formula

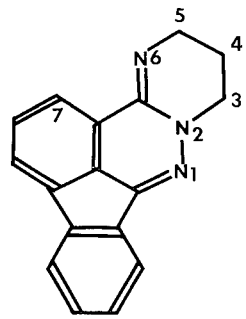

i.e. IVb, R forms part of a fused indene ring system);
imidazo[2,1-a]phthalazine (IVc, R=H);
6-phenyl-imidazo[2,1-a]phthalazine (IVc, R-C₆H₅);
6-(p.methoxyphenyl)-imidazo)[2,1-a]phthalazine (IVc, R= —⟨⟩—OCH₃ );

6-(p-chlorophenyl)-imidazo[2,1-a]phthalazine (IVc, R= —⟨⟩—Cl);

6-(m-chloro-p-methyl phenyl)-imidazo[2,1-a]phthalazine (IVc R= —⟨⟩—CH₃ );
        |
        Cl and imidazo[2,1-a]indeno[1,2,3-d,e]phthalazine formula

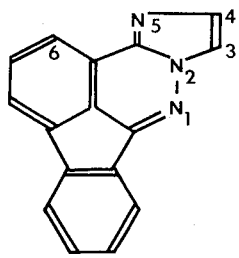

i.e. IVc, R forms part of a fused indene ring system).

The compounds of formula Ib include quinoline derivatives of the formula V

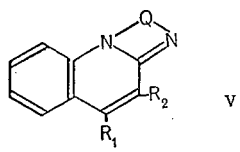

i.e. 1,2-dihydroimidazo[1,2-a]quinolines of formula Va;
1H-2,3-dihydropyrimido-[1,2-a]quinolines of formula Vb; and imidazo [1,2-a]quinolines of formula Vc:

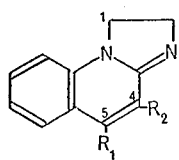

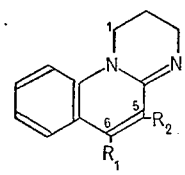

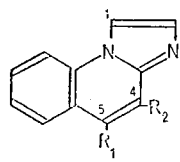

In formulae V above $R_1$ and $R_2$ independently represent an R radical and the definitions of formula 1 apply.

Examples of compounds of formula V are those in which the polycyclic nucleus is unsubstituted except for $R_1$ and $R_2$ and $R_1$ and $R_2$ independently represent hydrogen or phenyl. Specific examples are:

1,2-dihydroimidazo[1,2-a]quinoline(Va, $R_1=R_2=H$);
5-phenyl-1,2-dihydroimidazo[1,2-a]quinoline (Va, $R_1=C_6H_5, R_2=H$);
4,5-diphenyl-1,2-dihydroimidazo[1,2-a]quinoline (Va, $R_1=R_2=C_6H_5$);
1H-2,3-dihydropyrimido[1,2-a]quinoline (Vb, $R_1=R_2=H$);
6-phenyl 1H-2,3-dihydropyrimido[1,2-a]quinoline (Vb, $R_1=C_6H_5, R_2=H$);
imidazo[1,2-a]quinoline (Vc, $R_1=R_2=H$);
5-phenyl-imidazo[1,2-a]quinoline (Vc, $R_1=C_6H_5, R_2=H$); and
4-phenyl-imidazo[1,2-a]quinoline (Vc, $R_1=H, R_2=C_6H_5$).

The compounds of formula Ib include also isoquinoline derivatives of formula VI

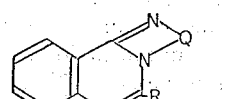

i.e. 2,3-dihydroimidazo[2,1-a]isoquinolines of formula VIa;
2H-3,4-dihydropyrimido[2,1-a]isoquinolines of formula VIb; and
imidazo[2,1-a]isoquinolines of formula VIc:

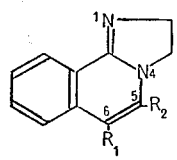

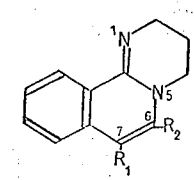

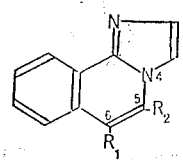

In formula VI above, R₁ and R₂ independently represent an R radical and the definitions of formula I apply.

Examples of compounds of formula VI are those in which the polycyclic nucleus is unsubstituted except for R₁ and R₂, and R₁ and R₂ independently represent hydrogen or phenyl, optionally substituted by one or more alkoxy, halogen or alkylthio radicals or together R₁ and R₂ represent a divalent radical, optionally substituted by one or more halogen or nitro radicals, joined to the isoquinoline nucleus to form a phenanthridine derivative.

Specific examples are:
2,3-dihydroimidazo[2,1-a]isoquinoline (VIa, R₁=R₂=H);
5-phenyl-2,3-dihydroimidazo[2,1-a]isoquinoline (VIa, R₁=H, R₂=C₆H₅);
5,6-diphenyl-2,3-dihydroimidazo[2,1-a]isoquinoline (VIa, R₁=R₂=C₆H₅);
5,6-di(p-methoxyphenyl)-2,3-dihydroimidazo[2,1-a]isoquinoline (VIa,

R₁ = R₂ =

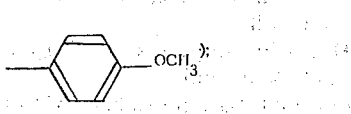

5-(p-hydroxyphenyl)-2,3-dihydroimidazo[2,1-a]isoquinoline (VIa,

R₁ = H, R₂ =

5-(p-methylthiophenyl)-2,3-dihydroimidazo[2,1-a]isoquinoline (VIa,

R₁ = H, R₂ =

2H-3,4-dihydropyrimido[2,1-a]isoquinoline (VIb, R₁=R₂=H);
6,7-diphenyl-2H-3,4-dihydropyrimido[2,1-a]isoquinoline (VIb, R₁=R₂=C₆H₅);
6-phenyl-2H-3,4-dihydropyrimido[2,1-a]isoquinoline (VIb, R₁=H R₂=C₆H₅);
imidazo[2,1-a]isoquinoline (VIc, R₁=R₂=H);
5,6-diphenyl-imidazo[2,1-a]isoquinoline (VIc, R₁=R₂=C₆H₅);
5-phenyl-imidazo[2,1-a]isoquinoline (VIc, R₁=H, R₂=C₆H₅);
2,3-dihydro-imidazo[1,2-f]phenanthridine (formula

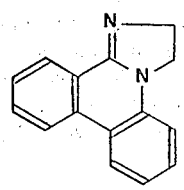

i.e. VIa, R₁ and R₂ form part of a fused benzene ring);
7-bromo-2,3-dihydroimidazo[1,2-f]phenanthridine (formula

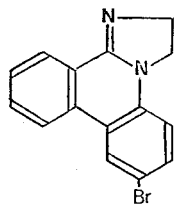

imidazo[1,2-f]phenanthridine (formula

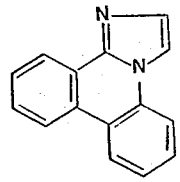

7-bromo-imidazo[1,2-f]phenanthridine (formula

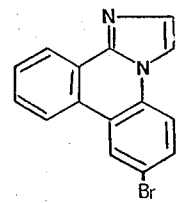

2H-3,4-dihydropyrimido[1,2-a]phenanthridine (formula

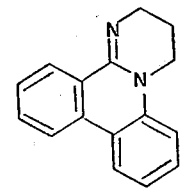

8-bromo-2H-3,4-dihydropyrimido[1,2-f]phenanthridine (formula

11

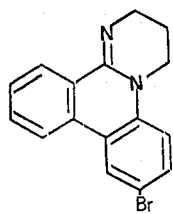

8-nitro-2H-3,4-dihydro-pyrimido[1,2-f]phenanthridine (formula

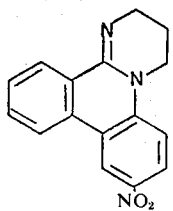

7-nitro-2,3-dihydro-imidazo[1,2-f]phenanthridine (formula

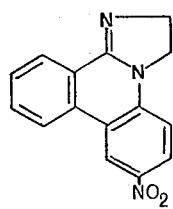

8-chloro-2H-3,4-dihydropyrimido[1,2-f]phenanthridine (formula

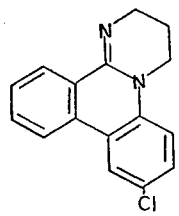

and 7-chloro--dihydro-imidazo[-dihydro-imidado[1,2-f]phenanthridine (formula

12

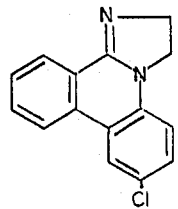

The compounds of formula Ic include quinoxaline derivatives of formula VII:

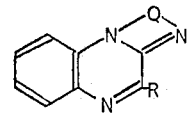 VII i.e. 1,2-dihydroimidazo[1,2-a]quinoxalines of formula VIIa;
1H-2,3-dihydropyrimido[1,2-a]quinoxalines of formula VIIb; and
imidazo[1,2-a]quinoxalines of formula VIIc:

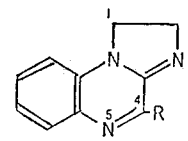 VIIa

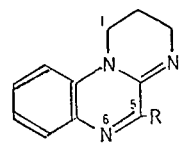 VIIb

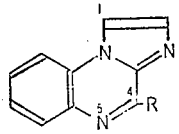 VIIc

The definitions of formula I apply to formulae VII.
Examples of compounds of formula VII are those in which the polycyclic nucleus is unsubstituted except for R and R represents hydrogen or phenyl, i.e.:
1,2-dihydroimidazo[1,2-a]quinoxaline (VIIa, R=H);
4-phenyl-1,2-dihydroimdazo[1,2-a]quinoxaline (VIIa, R=$C_6H_5$);

1H-2,3-dihydropyrimido[1,2-a]quinoxaline (VIIb, R=H);
5-phenyl-2H-2,3-dihydropyrimido[1,2-a]quinoxaline (VIIb, R=C₆H₅);
imidazo[1,2-a]quinoxaline (VIIc, R=H); and
4-phenyl-imidazo[1,2-a]quinoxaline (VIIc, R=C₆H₅).

The compounds of formula Ic include also quinazoline derivatives of formula VIII

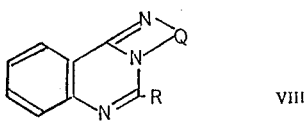

i.e. 2,3-dihydroimidazo[1,2-c]quinazolines of formula VIIIa;
2H-3,4-dihydropyrimido[1,2-c]quinazolines of formula VIIIb; and
imidazo[1,2-c]quinazolines of formula VIIIc:

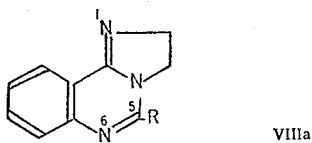

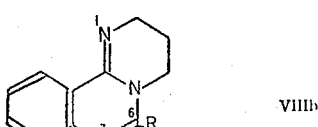

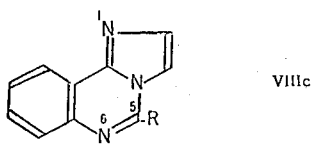

The definitions of formula I apply to formula VIII above.

Examples of compounds of formula VIII are those in which the polycyclic nucleus is unsubstituted except for R and R represents hydrogen or phenyl, i.e.:
2,3-dihydroimidazo[1,2-c]quinazoline (VIIIa, R=H);
5-phenyl-dihydroimidazo[1,2-c]quinazoline(VIIIa, R=C₆H₅);
2H-3,4-dihydropyrimido[1,2-c]quinazoline (VIIIb, R=H);
6-phenyl-2H-3,4-dihydropyrimido[1,2-c]quinazoline (VIIIb, R=C₆H₅);
imidazo[1,2-c]quinazoline (VIIIc, R=H); and
5-phenyl-imidazo[1,2-c]quinazoline (VIIIc, R=C₆H₅).

The compounds of formula I may be present in a pharmaceutical composition of the invention in the form of a pharmaceutically acceptable acid addition salt or quaternary ammonium derivative. Suitable acid addition salts include those with inorganic acids, for example hydrochloric, hydrobromic, nitric, sulphuric and phosphoric acids, or with organic acids, for example organic carboxylic acids such as glycollic, maleic, hydroxymaleic, malic, tartaric, citric, salicylic, o-acetyloxy-benzoic, nicotinic and isonicotinic acids, or organic, sulphonic acids, such as methane sulphonic, ethane sulphonic, 2-hydroxyethane sulphonic toluene-p-sulphonic and naphthalene-2-sulphonic acids.

Suitable quaternary ammonium derivatives are those formed by reaction with lower (i.e. $C_1$-$C_6$) alkyl halides, for example methyl, ethyl, or propyl chloride, bromide or iodide; di-lower alkyl sulphates, for example dimethyl or diethyl sulphate; lower alkyl lower alkane sulphonates, for example methyl or ethyl methane sulphonate or ethane sulphonate; lower alkyl aryl sulphonates, for example methyl or ethyl toluene-p-sulphonates; and phenyl-lower alkyl halides, for example benzyl or phenethyl chloride, bromide or iodide. Also included are the quaternary ammonium hydroxides and the quaternary ammonium compounds having as anions those of other inorganic or organic acids, for example those of the acids used for the preparation of the previously-mentioned acid addition salts.

The compounds of formula I may be administered orally, rectally or parentally and the compositions of the present invention will be formulated having regard to the manner of administration. The compositions may take the form of, for example, tablets, capsules, powders, suppositories, suspensions or injectable solutions. They may be prepared in any of the numerous manners well known in the art and will contain a compound of formula I in admixture or otherwise in association with a pharmaceutically acceptable carrier or diluent. The active compound may be mixed with a carrier, diluted with a diluent, or enclosed or encapsulated by the carrier in the form of a capsule, sachet, cachet, paper or other container. A carrier which serves as a vehicle, excipient or diluent medium for the active thereapeutic ingredients may be a solid, semi-solid or liquid material.

It will be appreciated however, that we do not include within the scope of the invention mere solutions of a known active ingredient in ordinary water or a common non-toxic organic solvent where such solutions are not in dosage unit form. The invention does however include within its scope formulations comprising the active ingredients in, for example, pyrogen-free water or a substantially isotonic saline solution.

Some examples of the carriers which may be employed in the pharmaceutical compositions of the invention are lactose, dextrose, sucrose, sorbitol, mannitol, starch, gum acacia, calcium phosphate, liquid paraffin, cocoa butter, oil of theobroma, alginates tragacanth, gelatin, syrup B.P., methyl cellulose, polyoxyethylene, sorbitan monolaurate, and methyl- and propyl-hydroxybenzoates.

The dosage required to treat any animal will of course depend upon inter alia the species, age and weight of the animal, the nature and severity of the disease from which the animal is suffering, and the efficacy of the actual compound administered. Appropriate dosages can readily be determined by those skilled in the art. Usually, the dosage administered will be within the range of 0.01 to 250 mg/kg body weight per day. For example, when a compound of formulae Ia or Ib is administered to adult humans for anti-inflammatory action or a compound of formula Ic is administered to adult humans for cardio-vascular action, they may be administered in dosages of from 0.01 to 15 mg/kg body weight one or more times a day.

The compositions of the invention may be provided in dosage unit form each of which units preferably contains from 1 to 1,000 mg, more advantageously from 5 to 500 mg and, most preferably, from 10 to 250 mg of the active compound of formula 1. The term "dosage unit" is used herein as meaning a physically discrete unit containing an individual quantity of the active ingredient in admixture with a pharmaceutical diluent therefor or otherwise in association with a pharmaceutical carrier, the quantity of the active ingredient being such that one or more units are normally required for a single therapeutic administration or that, in case of severable units such as scored tablets, at least one fraction such as a half or a quarter of a severable unit is required for a single therapeutic administration.

Some of the compounds of formula I are known but, as far as we are aware, their valuable pharmaceutical properties have remained undetected until the present invention was made. The majority of the compounds of formula I however, are novel and in particular the following compounds are novel at least when unsubstituted in the polycyclic nucleus except for R radicals:

1. all of the quinazoline derivatives of formula III;
2. the phthalazine derivatives of formula IV except for those compounds wherein R represents hydrogen when Q represents —CH$_2$.CH$_2$— or —CH=CH—;
3. the quinoline derivatives of formula V except for those compounds wherein R$_1$ and R$_2$ both represent hydrogen when Q represents —CH$_2$CH$_2$CH$_2$— or —CH=CH—;
4. the isoquinoline derivatives of formula VI except for those compounds wherein R$_1$ represents phenyl (i.e. unsubstituted phenyl) when R$_2$ represents hydrogen and Q represents —CH$_2$CH$_2$— or —CH=CH— or R$_1$ and R$_2$ both represent hydrogen when Q represents —CH=CH—;
5. the quinoxaline derivatives of formula VII except for those compounds wherein R represents hydrogen or phenyl when Q represents —CH$_2$CH$_2$— or —CH$_2$CH$_2$CH$_2$—; and
6. the quinazoline derivatives of formula VIII except for those wherein R represents hydrogen when Q represents —CH$_2$CH$_2$— or —CH=CH— or R represents phenyl or substituted phenyl when Q represents —CH$_2$CH$_2$— or —CH$_2$CH$_2$CH$_2$—.

According to the invention therefore, there is provided also benzazine derivatives of the formula:

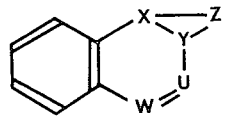

and acid addition salts and quaternary ammonium derivatives thereof
wherein $$-X-Z \atop \phantom{-}Y$$

represents a ring of formula IIa or IIb fused to the benzazine nucleus:

IIa   IIb

Q represents —CH$_2$CH$_2$—, —CH$_2$CH$_2$CH$_2$— or —CH=CH—;

U and W independently represent N or CR but at least one of U and W represents CR; and R represents hydrogen; phenyl optionally substituted by one or more alkyl, alkoxy, halogen, halogenoalkyl, hydroxy, hydroxyalkyl, alkylthio alkylsulphinyl or alkyl-sulphonyl, where each of said alkyl groups contains 1 to 4 carbon atoms; or a divalent radical joined to the benzazine nucleus to form an aromatic carbocyclic ring structure fused to said nucleus and, when the formula contains two R radicals, those R radicals may be the same or different; except for benzazine derivatives of the following formulae:

1)

wherein Q represents —CH$_2$CH$_2$— or —CH=CH— when R represents hydrogen;

2)

wherein Q represents —CH$_2$CH$_2$CH$_2$— or —CH=CH— when both R$_1$ and R$_2$ represent hydrogen;

3)

wherein R₁ represents phenyl when R₂ represents hydrogen;

4) 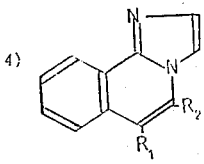

wherein R₁ represents phenyl when R₂ represents hydrogen or wherein both R₁ and R₂ represent hydrogen;

5) 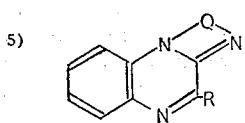

wherein Q represents —CH₂CH₂— or —CH₂CH₂CH₂— when R represents hydrogen or phenyl.

6) 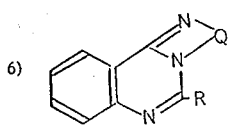

wherein Q represents —CH₂CH₂— or —CH=CH— when R represents hydrogen

7) 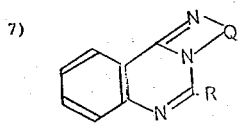

wherein Q represents —CH₂CH₂— or —CH₂CH₂CH₂— when R represents phenyl or substituted phenyl.

The novel compounds as defined above may be divided into classes Ia–Ic and sub-classes III–XIIIc in the manner discussed above with reference to the composition aspect of the invention.

In addition to the pharmaceutically acceptable acid addition salts and quaternary ammonium derivatives referred to hereinbefore, the compound aspect of the invention extends to other salts and derivatives for example picric acid and oxalic acid addition acid salts, which may be employed as intermediates in the purification or preparation of compounds of formula I and their pharmaceutically acceptable salts or for such purposes as identification or characterisation of the bases.

The compounds of formula I (including the novel compounds of the invention) may be prepared by one or more of a number of general methods which are known per se and some of which are discussed hereinafter. However, it has been found that certain cyclic amides can be reacted at elevated temperatures with certain ethylene diamine salts to form directly 2,3-dihydroimidazo benzazines of formula I. This reaction is considerably simpler than methods know per se for preparing said compounds and is unexpected.

The novel reaction is surprising also in that corresponding 1H-2,3-dihydropyrimidobenzazines are not formed when the ethylene diamine salt is replaced by the corresponding propylene diamine salt. According to a process aspect of the present invention, there is provided a method of preparing a 2,3-dihydro-imidazo benzazine compound of formula 1 (i.e. wherein Q represents —CH₂CH₂—) or an acid addition salt thereof which comprises heating together a mono-salt of ethylene diamine with a strong acid and a cyclic amide of the formula IX

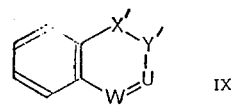   IX wherein
one of X' and Y' represents C=O or C=S and the other represents >NH
U and W are as defined in formula I except that when U represents CR and W represents N, R does not represent hydrogen,
and wherein the polycyclic nucleus and any aryl or divalent radical represented by R optionally are substituted by one or more substituent radicals which are inert under the reaction conditions employed in that they do not prevent formation of the fused

ring.

It is preferred that the reaction is carried out in the absence of a solvent by heating the ethylene diamine salt and the cyclic amide to a temperature at least that at which the reaction mixture melts. A suitable reaction temperature is in the range 200°–270°C, preferably 220°–260°C.

When the product is readily oxidized it may be necessary to carry out the reaction under an inert atmosphere such as nitrogen to avoid oxidation of the product. Usually, the reaction time will be in the range 6 to 20 hours.

The ethylene diamine salt may be prepared in situ by adding equivalent proportions of ethylene diamine and strong acid to a reaction vessel. An excess of acid should be avoided as it has been found that di-salts of ethylene diamine with strong acids will not react with cyclic amides of formula IX to produce the desired 2,3-dihydroimidazo-benzazine product. The strong acid may be a mineral acid, such as hydrochloric or sulphuric acid, but preferably is an organic sulphonic acid, especially toluene p sulphonic acid.

Advantageously the ethylene diamine salt and the cyclic amide are reacted in a molar proportion of from 1:1 to 10:1, preferably 2:1.

The process of the present invention may be employed to prepare all of the 2,3- dihydroimidazobenzazines of formula 1 except when U represents CH and W represents N although in some cases direct formation of a particular compound from the corresponding cyclic amide may not be possible. For example, 2,3-dihydroimidazobenzazine compounds of formula 1 having a nitro substituent apparently cannot be prepared by reacting an ethylene diamine salt with the corresponding cyclic amide. However, it will be readily apparent to those skilled in the art that those compounds which cannot be prepared directly by the said novel reaction of the invention may be obtained by methods known per se from related dihydroimidazobenzazine compounds which can be prepared directly.

The dihydroimidazo- and dihydropyrimidobenzazine derivatives of formula I may be prepared by cyclisation in manner known per se of an appropriate hydroxy-alkylamino heterocyclic reactant. The reaction proceeds via the corresponding chloroalkylamino heterocyclic, which may or may not be isolated, and is represented by the following equation:

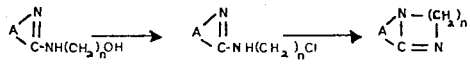

wherein A represents the residue of a benzazine nucleus as defined in formula 1 and $n$ represents 2 or 3. The conversion of the hydroxy-alkylamino compound into the chloroalkyl amino compound may be effected by refluxing with excess phosphorus oxychloride at, for example, 105°C for a period of up to 5 hours. Alternatively, the hydroxy-alkylamino compound may be refluxed with thionyl chloride at, for example, 79°C for a period of up to 5 hours. Cyclisation of the chloroalkylamino intermediate may be performed by treatment in aqueous or aqueous alcohol solution with potassium carbonate (optionally after initial treatment with ammonium hydroxide) or with sodium hydroxide, or by refluxing with industrial methylated spirits.

The hydroxyalkyl amino reactant usually will be obtained by reaction of a corresponding chloroheterocyclic with a hydroxyalkylamine, the chloroheterocyclic itself having been obtained from a cyclic amide by, for example, refluxing with phosphoryl chloride. Thus, the total reaction sequence from the cyclic amide to the benzazine may be represented by the following equation:

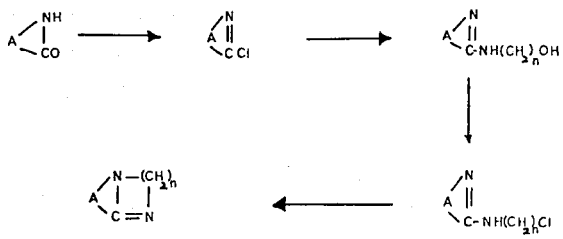

It is readily apparent from the above equation that the novel process of the present invention represents a considerable advance in the art in that it enables certain of the dihydroimidazo benzazines to be prepared by a single reaction step as follows:

The novel process is illustrated in Examples 1 to 6 hereinafter and the above-described hydroxyalkylamino cyclisation is illustrated in Examples 7 to 15.

Dihydroimidazo- and dihydropyrimido - isoquinolines of formula I may be prepared also by reaction in manner known per se of an isocoumarin with an ethylene or propylene diamine mono-salt of a strong acid, e.g. ethylene diamine monotosylate or propylene diamine monotosylate (as a 1:1 mixture of propylene diamine and propylene diamine ditosylate because of the instability of the monosalt). The reaction, which is illustrated in Example 25, may be represented as follows:

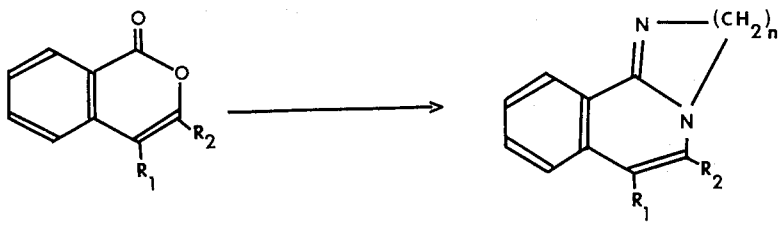

wherein $n$ represents 2 or 3.

The salt and isocoumarin may be used in a molar ratio of 2 to 10:1, preferably 5:1. Suitably the reaction is performed in the absence of a solvent and at a temperature of 180° to 240° for a period of 4 to 5 hours.

A further method of preparing dihydroimidazo- and dihydropyrimido-isoquinolines of formula 1 is the novel reaction of a phenacylbenzoic acid or an ester thereof with an ethylene or propylene diamine monosalt of a strong acid, e.g. ethylene diamine monotosylate or propylene diamine monotosylate (as a 1:1 mixture of propylene diamine and its ditosylate salt). The reaction, which is illustrated in Examples 23 and 24, may be represented as follows

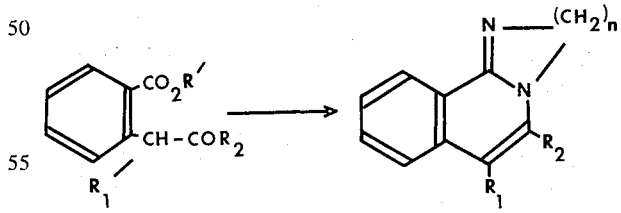

wherein —$CO_2R'$ represents a carboxylic acid or ester grouping, $R_2$ represents aryl optionally substituted by one or more substituent radicals which are inert to the reaction conditions employed, $n$ represents 2 or 3 and the cyclic nucleus optionally is substituted by one or more radicals which are inert to the reaction conditions.

The salt and benzoic acid or ester may be used in a molar ratio of 2 to 10:1, preferably 5:1. Suitably the reaction is carried out in the absence of a solvent and at a temperature of 180° to 240°C for a period of 3 to 5 hours.

Imidazo-benzazines of formula I may be prepared in manner known per se by refluxing an appropriate α-chloroheterocyclic reactant with aminoacetaldehyde dimethyl (or diethyl) acetal in a high boiling solvent such as diglyme or dioxan for a period of up to 24 hours. The reaction proceeds in two stages as represented by the following equation:

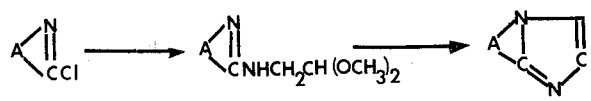

In some cases, especially when using diglyme as the solvent, the intermediate will spontaneously undergo the second step but usually the intermediate is refluxed with a strong acid is required before the cyclisation will occur. Examples 17 to 20 illustrate this process.

An alternative route to the imidazobenzazines of formula I is the dehydrogenation of the corresponding dihydroimidazobenzazine. Numerous suitable methods are known per se for performing this dehydrogenation. An example of a suitable method, using 5% palladium on charcoal as catalyst in a suitable high boiling solvent optionally in the presence of a hydrogen acceptor is described in Example 21.

Other methods of preparing the compounds of formula 1 will be readily apparent to those skilled in the art. In particular, standard techniques may be employed to prepare acid addition salts and quaternary ammonium derivatives of the compounds and to convert said salts or derivatives into other salts or derivatives or into the free base.

The invention is illustrated in the following Examples:

EXAMPLE 1

1, 2-dihydroimidazo [1,2-a] quinoline hydrogen maleate 2-hydroxyquinoline (8.5 g.) was heated with ethylenediamine monotosylate (30 g.i.e. 100% excess) at 240°C for 6 hours. The reaction mixture was cooled and extracted with dilute hydrochloric acid (300 mls). The solution was filtered, basified to pH 10 and extracted with chloroform. The extract was washed, dried and evaporated to dryness. The oily residue was dissolved in chloroform and treated with ethereal hydrogen chloride. The yellow solid precipitated was filtered off, washed, dried and dissolved in water. The solution was basified and the extraction procedure repeated (yield of crude base 6.3 g). The crude base was dissolved in ether (slight amount insoluble) and the solution treated with a solution of maleic acid (6.8 g.i.e. 1 equivalent) in ether (ca. 120 mls.).

The yellow solid formed was filtered off and recrystallised from isopropanol to yield pale yellow crystals of 1,2-dihydroimidazo[1,2-a] quinoline hydrogen maleate, M.P. 282°–3°C (decomp.)

EXAMPLE 2

2, 3-dihydroimidazo [2, 1-a] phthalazine

An intimate mixture of phthalazone (20 g. 0.137 mole) and ethylene diamine monotosylate (60 g. ca. 0.25 mole) was heated at 220°C for 6 hours. The reaction mixture was cooled and dissolved in hot dilute hydrochloric acid (300 ml.). The cooled acid solution was extracted several times with chloroform and then basified with sodium hydroxide solution. The oil precipitated was dissolved in chloroform (300 ml.) washed with water and dried (anhydrous magnesium sulphate). The solution was filtered and treated with ethereal hydrogen chloride. The brown solid precipitated (9 g.) was filtered off and recrystallised twice from industrial methylated spirits (I.M.S.) (charcoal) to yield pale yellow crystals of 2, 3-dihydroimidazo [2, 1-a] phthalazine hydrochloride. M.P. 337°–9°C.

EXAMPLE 3

6-Phenyl-2,3-dihydroimidazo[2,1-a]phthalazine

An intimate mixture of phenyl phthalazone (22.2 g., 0.1 mole) and ethylene diamine monotosylate (47 g., 0.2 mole) was heated at 240°C for 20 hours. The reaction mixture was cooled and extracted with hot dilute hydrochloric acid (3 × 100 ml.). The extract was cooled and filtered and the filtrate was basified with sodium hydroxide solution. The precipitate formed was collected and dried (yield 22.8 g.) and recrystallised from cyclohexane (800 ml) and then benzene to yield yellow crystals of 6-phenyl-2,3-dihydroimidazo [2,1-a] phthalazine m.p. 156°–7°C.

EXAMPLE 4

2,3-dihydro-imidazo [1,2-f] phenanthridine hydrochloride

Phenanthridone (8 g.) was heated with ethylene diamine monotosylate (20 g.i.e. 100% excess) for 14 hours at 230°C. The cooled reaction mixture was extracted with hot dilute hydrochloric acid (ca. 400 mls.) cooled and filtered. The filtrate was basified with sodium hydroxide solution and the crude base filtered off, washed and dried. (Yield 7.3g 81%, 94% based on reacted phenanthridone). A sample of the free base was purified by crystallisation from cyclohexane to give yellow crystals m.p. 129°–130°. The crude base was dissolved in chloroform (ca. 100 mls.) and filtered through Hyflo. The filtrate was treated with etheral hydrogen chloride and excess ether. The white solid precipitated was filtered off and recrystallised from IMS (charcoal) to yield white crystals of 2, 3-dihydroimidazo [1,2-f] phenanthridine hydrochloride. M.P. ca. 335°C (dec.).

EXAMPLE 5

The following compounds have been prepared by the reaction of an appropriate cyclic carbamide with ethylene diamine mono-tosylate by methods substantially as described in one or other of Examples 1 to 4:

4-phenyl-1,2-dihydroimidazo[1,2-a]quinoline hydrochloride (m.p. 327°–334°C);
6-(p-chlorophenyl)-2,3-dihydroimidazo[2,1-a] phthalazine (m. p. 161°–2°C);
6-(m-chloro-p-methylphenyl)-2,3-dihydroimidazo [2,1-a] phthalazine (m. p. 155°–8°); and
2,3-dihydroimidazo[2,1-a] isoquinoline hydrochloride (m. p. 303°–7°C)
2,3-dihydroimidazo[2,1-a]phthalazine (m. p. 105°–7°C)
7-chloro-2,3-dihydroimidazo[2,1-a]phthalazine hydrochloride hydrate (m. p. 353°–360°C).

EXAMPLE 6

7-Bromo-2,3-dihydroimidazo (1,2-f) phenanthridine hydrochloride

Crude bromophenanthridone (19 g. 0.07 mole) was heated with ethylenediamine monotosylate (80 g. 0.345 mole) at 260°C for 7 hours. The reaction mixture was cooled and extracted with hot dilute hydrochloric acid (5 × 150 mls) and filtered hot. The crystals formed on cooling were filtered off, dried (yield 6.2 g.) and recrystallised from water (charcoal) to yield yellow crystals of 7-bromo-2, 3-dihydroimidazo (1,2-f)phenanthridine hydrochloride (5.2 g.) MP 330°-3°C.

A further 4.9 g. of product was obtained by basifying the mother liquors from the acid extraction and boiling the oil formed with dilute hydrochloride acid (500 mls) and filtering the hot solution. The crystals formed on cooling were collected and recrystallised from water (charcoal) to give 7-bromo 2,3-dihydroimidazo (1,2-f) phenanthridine hydrochloride. A sample of the free base m.p. 175°-176° was obtained by basifying the recrystallisation mother liquors and crystallising the resultant solid from a mixture of benzene and light petroleum (bp 40°-60°).

EXAMPLE 7

2-(2-hydroxyethylamino)-4phenylquinazoline 2-chloro-4-phenylquinazoline (24 g. 0.1 mole) was refluxed in dry dioxan (100 ml.) with ethanolamine (12.2g. 0.2 mole) for 9 hours. The reaction mixture was cooled and evaporated to small volume under reduced pressure. The residue was treated with chloroform and the combined filtered (Hyflo) extracts (150 ml.) were washed and dried ($MgSO_4$). Evaporation yielded an oil (28 g.) which was used directly in the next stage. Granulation of a sample of this oil under ether followed by crystallisation from isopropanol gave a pure sample of 2-(2-hydroxyethylamino)-4-phenylquinazoline m.p. 128°-130°.

2-(2-chloroethylamino)-4-phenylquinazoline

Phosphorus oxychloride (150 ml.) was added carefully to the crude hydroxyethylamino compound (28 g.). When the vigorous exothermic reaction had subsided, the mixture was heated under reflux for 2 hours, cooled and poured onto ice and ammonium hydroxide solution. The basic mixture was extracted with chloroform (3 × 300 ml.) which yielded on evaporation of the washed and dried extracts a solid product (17.5 g.) which was used without purification in the final stage.

1,2-dihydro-5-phenylimidazo[1,2-a]quinazoline hydrochloride dihydrate

The product (17 g.) from the previous stage was refluxed in IMS (30 ml.) for 2 hours. The insoluble material was filtered from the hot solution and petroleum ether (b.p. 40°-60°) was added to the hot filtrate. The crystals formed were collected and recrystallised from IMS/petroleum ether (b.p. 40°-60°). The product was allowed to equilibrate for 2 days in a desiccator over water and then allowed to stand under atmospheric conditions for one week to yield yellow crystals of 1,2-dihydro-5-Phenyl imidazo [1,2-a] quinazoline hydrochloride dihydrate, m.p. 301°-6°C.

EXAMPLE 8

1-(3-hydroxypropyl amino)phthalazine

Crude 1-chlorophthalazine (42g.) was mixed with 3-propanolamine (60g. ca. 3 moles) and set aside overnight. The viscous solution formed was heated on a water bath for 5 hours, and then treated with water (250 ml.) and continuously extracted with chloroform (8 hours). The solid obtained on evaporation of the chloroform extract was used directly in the next stage.

2H-3,4-dihydropyrimido [2,1-a] phthalazine hydrochloride dihydrate

Crude 1-(3-hydroxypropyl amino)phthalazine (20.9 g.) was cautiously treated with phosphorus oxychloride (50 ml.). When the vigorous exothermic reaction had subsided, a further 50 ml. of phosphorus oxychloride was added and the mixture was refluxed for 4 hours, cooled and poured onto ice and ammonium hydroxide solution. The ammoniacal liquors (ca. 2 liters) were basified with saturated potassium carbonate solution (500 ml.) and the resulting mixture was extracted with chloroform. Evaporation of the dried extracts yielded a red oil (14 g.) which solidified overnight. The residue was taken up in chloroform and treated with ethereal hydrogen chloride solution and excess dry ether. The white precipitate was collected and crystallised from IMS (75 ml.) Yield 8.4g. The white needles formed, rapidly hydrated on standing and equilibrium was attained by standing the crushed crystals over water for 7 days, to yield 2H-3,4-dihydropyrimido [2,1-a] phthalazine hydrochloride dihydrate, m.p. 282°-4°C.

By a similar method the corresponding 6-phenyl compound was prepared and isolated as its free base m.p. 116°-118°.

EXAMPLE 9

6-[3-hydroxypropylamino] phenanthridine

6-Chlorophenanthridine (19.8 g.) was refluxed in dry dioxan (100 ml.) with 3-aminopropanol (14 g. 2 moles) for 11 hours. The reaction mixture was evaporated to dryness and the residual oil taken up in chloroform (200 ml.) The chloroform solution was washed with saturated sodium chloride solution and dried ($MgSO_4$). On evaporation, the chloroform solution gave a yellow solid residue of 6-[3-hydroxypropylamino] phenanthridine (23.6g.) which was used directly in the next stage. Crystallisation of a small sample from benzene gave crystals of 6-[3-hydroxypropylamino]phenanthridone m.p.134°-135°. 6-[3-chloropropylamino]phenanthridine Crude 6-[3-hydroxypropylamino] phenanthridine (21.6g.) was refluxed in phosphorus oxychloride (100 ml.) for 6 hours. The solution was cooled and poured with stirring onto ice and ammonium hydroxide solution. The mixture was allowed to warm to room temperature and then extracted with chloroform (3 × 200 ml.). The chloroform solution was washed with water, dried ($MgSo_4$) and evaporated to dryness to yield an oily residue of 6-[3-chloropropylamino] phenanthridine (19.5 g.). This was used without further purification in the next stage.

2H-3,4-dihydropyrimido[1,2-a]phenanthridine hydrochloride hydrate

Crude 6-[3-chloropropylamino] phenanthridine (19.5 g.) was treated with 220 ml. of a 50% alcoholic solution of 1.25N sodium hydroxide. The solution was boiled under reflux for 2 hours and then cooled and acidified with 5N hydrochloric acid (60 ml.) and then evaporated to dryness and the residue taken up in water. The solution was basified with saturated potassium carbonate solution and extracted with chloroform. The organic layer was washed and dried (MgSO$_4$) and evaporated to an oily residue. The oil was dissolved in chloroform and treated with ethereal hydrogen chloride solution and excess dry ether. The solid precipitated was removed, treated with water and filtered. The filtrate was basified and extracted with chloroform. The hydrochloride was reformed by the above procedure and recrystallised from IMS/ether to yield white crystals of 2H-3,4-dihydropyrimido[1,2-a]phenanthridine hydrochloride monohydrate, m.p. 285°–90°C (softening at 250°).

EXAMPLE 10

3H-4,5-dihydroindeno[1,2,3-de]pyrimido[2,1-a]phthalazine hydrochloride monohydrate 3-(3-Hydroxypropylamino)indeno[1,2,3-de]phthalazine(16 g.) was treated with phosphorus oxychloride (100 ml.). When the exothermic reaction had subsided the mixture was heated under reflux for 2.5 hours. The cooled solution was poured onto ice and ammonium hydroxide solution and the mixture basified with saturated potassium carbonate solution. Chloroform extraction yielded an oil (16.4 g.) which solidified on standing. The solid was taken up in chloroform and the solution treated with ethereal hydrogen chloride and excess dry ether. The yellow solid precipitated was collected and recrystallised from IMS (ca. 800 ml.). The product was allowed to stand over water for 4 days to yield 3H-4,5-dihydroindeno[1,2,3-de] pyrimido[2,1-a]phthalazine hydrochloride monohydrate, m.p. 345°–50°C.

EXAMPLE 11

3,4-Dihydroimidazo[2,1-a]indeno[1,2,3-de]phthalazine

3(2-Hydroxyethylamino)indeno[1,2,3-de]phthalazine (12.6 g.) was refluxed in phosphorus oxychloride (100 ml.) for 1.5 hours. The reaction mixture which had precipitated a yellow solid was cooled and poured onto ice and ammonium hydroxide solution. The stirred mixture was basified further with potassium carbonate solution (200 ml.) and the liquors extracted with chloroform. Evaporation of the dried extracts yielded a yellow solid (10 g.) which was taken up in chloroform and treated with ethereal hydrogen chloride and excess dry ether. The solid precipitated was collected, dried and treated with water (500 ml.). After filtration, the solution was basified with potassium carbonate solution and the yellow solid was collected and dried. The crude product was recrystallised from benzene to yield yellow crystals of 3,4-dihydroimidazo[2,1-a] indeno[1,2,3-d,e]phthalazine, m.p. 176°–8°C.

EXAMPLE 12

2-Bromo-6-chlorophenanthridine

2-Bromophenanthridone (63 g. 0.23 mole) was refluxed in phosphoryl chloride (200 ml.) for 5 hours. The cooled mixture was added slowly to ice-ammonia and the precipitate was collected, washed and dried. The crude solid (67 g.) was used directly in the next stage. An analytical sample was obtained by recrystallisation from acetone (20 parts) to give white needles of 2-bromo-6-chlorophenanthridine, m.p. 167°–168°.

2-bromo-6-(3-hydroxypropylamino)phenanthridine

The crude chloro compound (50 g. 0.17 mole) was refluxed with propanolamine (25.6 g. 0.34 mole) in dry dioxan (250 ml.) for 16 hours. The reaction mixture was concentrated and the residue was treated with water. The solid obtained was filtered off, washed, dried and recrystallised from IMS (10 parts) to give white crystals of 2-bromo-6-(3-hydroxypropylamino)-phenanthridine (34.7 g.). An analytical sample was obtained by refluxing a portion (1 g.) of this material with hydrochloric acid (40 mls. of a 2.5N solution in 50% aqueous alcohol).

The solution was cooled and filtered and the filtrate basified. The solid obtained was recrystallised from acetone to give white crystals m.p. 172°–174°.

8-Bromo-2H-3,4-dihydropyrimido[1,2-f]phenanthridine hydrochloride

The partially purified hydroxypropylamino compound (33.1 g. 0.1 mole) was heated under reflux with phosphoryl chloride (150 ml.) for 16 hours. The cooled solution was poured onto ice-ammonia and the stirred mixture was further basified with saturated potassium carbonate solution. The precipitate was collected, washed and dried. The crude base (30 g. 97%) was heated under reflux with 2N hydrochloric acid (900 ml.). The mixture was cooled and the solid collected, dried and extracted with water in a Soxhlet for 16 hours. The aqueous extract was cooled and filtered and the solid obtained was washed, dried and recrystallised from IMS (25 parts) twice to give white needles of 8-bromo-2H-3,4-dihydropyrimido [1,2-f]phenanthridine hydrochloride m.p. 341°–343°.

EXAMPLE 13

6-(3-hydroxypropylamino)-2-nitrophenanthridine

Prepared by essentially the same method as that used for the 2-bromo compound (see preparation of Example 12). Crude yield 89%. Analytical sample from recrystallisation with acetone. (100 parts). m.p. 212°–214°.

2H-3,4-dihydro-8-nitropyrimido[1,2-f]phenanthridine hydrochloride hydrate

Prepared as for the 8-bromo compound (see Example 12). The hydrochloride was prepared by refluxing the crude base (46.8 g.) in dilute hydrochloric acid (500 ml.). The solid collected from the cooled mixture was recrystallised from water (3.5 litres)(charcoal) and allowed to equilibrate at room temperature in a humid atmosphere for 3 days. Yellow plates of 2H-3,4-dihydro-8-nitro phenanthridine hydrochloride hydrate. m.p. 344°–345°.

EXAMPLE 14

6-(2-Hydroxyethylamino)-2-nitrophenanthridine

6-Chloro-2-nitrophenanthridine (53.1 g.) and ethanolamine (25.1g) were heated under reflux in dioxan (250 ml.) for 11 hours. The solid obtained by treating the evaporated reaction mixture with water was collected washed and dried. Crystallisation from 2-ethoxyethanol gave 6-(2-hydroxyethylamino)-2-nitrophenanthridine m.p. 246°–249°.

2,3-Dihydro-7-nitroimidazo [1,2-f] phenanthridine hydrochloride hydrate

The crude hydroxyethylamino compound (54.6g) was heated under reflux with phosphoryl chloride (200 ml.) for 22 hours. The cooled reaction mixture was poured onto ice and ammonia and the mixture was basified with saturated potassium carbonate solution. The solid obtained was collected and boiled with dilute hydrochloric acid (600 ml.) for 16 hours and the cooled mixture was filtered. Crystallisation of the resultant solid (32g) from water (1500 ml., charcoal) gave yellow plates of 2,3-dihydro-7- nitroimidazo [1,2-f] phenanthridine hydrochloride hydrate m.p. 346°–347°.

EXAMPLE 15

The following compounds have been prepared by cyclisation of an appropriate hydroxyalkylamino heterocyclic reactant by methods suubstantially as described in Examples 7 to 14:

6-phenyl-1H-2,3dihydropyrimido [1,2-a]quinazoline hydrochloride (m.p. 338°–342°C);
7-(p-chlorophenyl)-2H-3,4-dihydropyrimido[2,1-a] phthalazine (m.p. 166°C);
6-phenyl-1H-2,3-dihydropyrimido [1,2-a]quinoline hydrochloride (m.p. 290°–294°C);
5-phenyl-1H-2,3-dihydropyrimido [1,2-a] quinoxaline (m.p. 146°–7°C);
8-chloro-2H-3,4-dihydropyrimido[1,2-f] phenanthridine (m.p. 130°–132°C).

EXAMPLE 16

2H-3,4-dihydropyrimido[2,1-a]isoquinoline hydrochloride dihydrate 1-(3-hydroxypropyl-amino)isoquinoline (27.9g) was treated cautiously with thionyl chloride (100 ml, cooled in an ice bath). The reaction mixture was heated under reflux for 5 hours and the excess thionylchloride removed on a water pump. The solid residue was added to a mixture of potassium carbonate (42 g), water (500 ml) and alcohol (500 ml) and the mixture was stirred for 5 hours. Chloroform extraction gave an oil which was redissolved in chloroform (200 ml) and treated with ethereal hydrogen chloride and an excess of dry ether. The crude hydrochloride was purified by sequential water treatment, chloroform extraction, basification, re-extraction and reformation of the hydrochloride. Crystallisation from methanol gave 2H-3,4-dihydropyrimido[2,1-a]isoquinoline hydrochloride dihydrate (m.p. above 360°C).

EXAMPLE 17

6-Phenylimidazo [2,1-a] phthalazine hydrochloride

1-Chloro-4-phenylphthalazine (24g., 0.1 mole) and amino acetaldehyde dimethylacetal (21g., 0.2 mole) were heated under reflux in diglyme (100 ml.) for 24 hours. The reaction mixture was cooled and poured into water. The precipitate was collected and heated under reflux with dilute hydrochloric acid (500 ml) for 2 hours. The mixture was evaporated to dryness and the residue boiled with water (700 ml charcoal). The solid obtained by evaporation of the filtered aqueous extract was crystallised from IMS to give white crystals of 6-phenylimidazo [2,1-a] phthalazine hydrochloride m.p. 268°–273°.

EXAMPLE 18

Imidazo[2,1-a]indeno[1,2,3-de]phthalazine

3-Chloroindeno[1,2,3-de]phthalazine(18.6 g.) was refluxed with aminoacetaldehyde dimethylacetal (16.4 g. 2mole) in diethylene glycoldimethyl ether (100 ml.) for 17 hours. The reaction mixture was cooled and poured into water and the precipitated solid was collected and washed. The wet solid was heated with dilute hydrochloric acid (3 × 200 ml.) and the cooled mixture was filtered. The filtrate was basified with concentrated ammonium hydroxide solution and the solid formed was filtered off, washed and dried. The crude product (17 g.) was recrystallised from IMS (600 ml. charcoal) to give yellow crystals of imidazo[2,1-a]indeno[1,2,3-de]phthalazine m.p. 212°–3°.

EXAMPLE 19

Imidazo[1,2-f]phenanthridine hydrochloride dihydrate

6-Chlorophenanthridine (187.5 g. 0.88 mole) and aminoacetaldehydedimethyl acetal (184.4 g. 1.76 mole) were refluxed in diglyme (600 ml.) for 18 hours. The reaction mixture was evaporated to a thick oil which was heated with hot 2 N hydrochloric acid (600 ml.). The hot solution was poured into water (2 litres) and allowed to cool. The filtrate was brought to pH 7 with conc. ammonia and the solid formed was collected, washed and dried. The crude solid was boiled with a mixture of 5 N hydrochloric acid (300 ml.) and water (2 litres) for 5 hours and then cooled. Basification of the filtered solution gave a solid which was washed and dried. The crude base (122 g.) was boiled with IMS (800 ml;charcoal) and allowed to cool. The stirred solution was treated with ethereal hydrogen chloride solution (ca 200 ml.) and the thick mixture was filtered. The solid obtained was added portion wise to the boiling filtrate and the solution was treated with charcoal.

To the hot filtrate was added light petroleum (bp 40°–60°,900 ml.) and the crystals that formed were collected, dried in a desiccator and allowed to equilibrate over water for 7 days to give white crystals of imidazo [1,2-f] phenanthridine hydrochloride dihydrate m.p. 256°–260°. A second crop was obtained by evaporation of the mother liquors and a recrystallisation from the same solvent. The corresponding 7-bromocompound was similarly prepared from 2-bromo-6-chlorophenanthridine. Crystallisation from IMS gave white crystals of 7-bromoimidazo [1,2-f] phenanthridine hydrochloride dihydrate m.p. 273°–277°.

EXAMPLE 20

The following compounds have been prepared by the reaction of an appropriate α-chloro heterocyclic reactant with aminoacetaldehydedimethylacetal by methods substantially as described in one or the other of Examples 16 to 19.

5-phenyl-imidazo[1,2-a]quinoline hydrogen maleate (m.p. 164°–166°C);
4-phenyl-imidazo[1,2-a]quinoline hydrochloride hydrate (m.p. 225°–229°C);
imidazo[2,1-a]isoquinoline hydrochloride hydrate (m.p. 264°–273°C);

imidazo[1,2-]quinoxaline hydrochloride (m.p. 267°–268°C);
4-phenyl-imidazo[1,2-a]quinoxaline (m.p. 154°–7°C);
5-phenyl-imidazo [1,2-a]quinazoline hydrochloride hydrate (m.p. ca. 275°C-dec.);
6-(p-methoxyphenyl)-imidazo[2,1-a]phthalazine hydrochloride (m.p. 268°–271°C);
6(p-chlorophenyl)-imidazo[2,1-a]phthalazine hydrochloride (m.p. 255°–260°C).
6-(m-chloro-p-methylphenyl)imidazo[2,1-a] phthalazine hydrochloride (m.p. 285°–287°C);
imidazo[1,2-c]quinazoline (m.p. 148°–148.5°C);
imidazo[1,2-c]quinazoline hydrogen maleate (m.p. 195°–198°C);
5-phenyl-imidazo[1,2-c]quinazoline hydrogen maleate (m.p. 159°–162°C).

EXAMPLE 21

Imidazo[1,2-f]Phenanthridine Hydrochloride 2,3-dihydro-imidazo[1,2-f] phenanthridine (16 g.) methyl cinnamate (11.5 g. equimolar) and 5% Pd/C(6g.) were stirred under reflux in p-cymene (200 ml.) for 24 hours. The reaction mixture was cooled and filtered through Hyflo, the catalyst was washed with dilute hydrochloric acid and the combined filtrates were extracted with dilute hydrochloric acid (3 × 100 ml.). The acid extract was washed with chloroform (100 ml) and basified with saturated potassium carbonate solution. The basic mixture was extracted with chloroform (3 × 100 ml) and the extract was washed, dried and evaporated to dryness. A portion of the residue was crystallised from acetone to give red crystals of the free base m.p. 140°–141°. The crude base (12g.) was dissolved in chloroform (100 ml) and treated with etheral hydrogen chloride and excess ether. The white solid precipitated was recrystallised from a mixture of IMS and light petroleum (b.p. 40°–60°) to yield white crystals of imidazo[1,2-f] phenanthridine hydrochloride, m.p. 256°–60°C.

EXAMPLE 22

Using substantially the same method as described in Example 21, the following compounds were prepared:
5,6-diphenyl-imidazo[2,1-a]isoquinoline (m.p. 241°–243°C)
5-phenyl-imidazo[2,1-a]isoquinoline hydrochloride (m.p. 290°–292°C)

EXAMPLE 23

5-phenyl-2,3-dihydroimidazo [2,1-a]isoquinoline

An intimate mixture of o-phenacylbenzoic acid (9g) and ethylenediamine monotosylate (44g., 5 equivalents) was heated to 240°C in an open flask for 6 hours. The solid residue was treated with water and filtered, the precipitate was taken up in chloroform, washed with dilute sodium hydroxide solution and water. Evaporation of the dried extract gave a solid which was crystallised from cyclohexane to give 5-phenyl-2,3-dihydroimidazo [2,1-a]isoquinoline (m.p. 147°–149°C).

EXAMPLE 24

2H-3,4-dihydro-6-phenyl-pyrimido[2,1-a] isoquinoline hydrochloride hemihydrate

A stirred mixture of o-phenacylbenzoic acid (12 g) propanediamine ditosylate (56.8 g, 2.5 equivalents) and propanediamine (9.25 g, 2.5 equivalents) was heated in an open flask at 180°–220°C for 3½ hours. The cooled reaction mixture was partitioned between water and chloroform and the chloroform extract was washed with dilute sodium hydroxide solution and water. Evaporation of the dried extract gave an oil which was taken up in chloroform and treated with ethereal hydrogen chloride and dry ether. The hydrochloride was dissolved in water and the pH of the solution was adjusted to 7 with N/10 ammonium hydroxide solution. Continuous extraction with ether (6 hours) was followed by basification and extraction with chloroform. The dried chloroform extract was treated with ethereal hydrogen chloride and dry ether and the precipitate crystallised from methanol/ether to give 2H-3,4-dihydro-6phenylpyrimido[2,1-a]isoquinoline hydrochloride hemihydrate (m.p. 302°–5°C).

EXAMPLE 25

5,6-diphenyl-2,3-dihydroimidazo[2,1-a]isoquinoline

An intimate mixture of 3,4-diphenyl isocoumarin (29.8 g) and ethylene diamine monotosylate (118 g, 5 equivalents) was heated at 180°–240°C in an open flask for 4 hours. The solid obtained on cooling to room temperature was broken up and stirred with water. Filtration gave a solid residue which was taken up in chloroform and washed with dilute hydroxide solution and water. Evaporation of the dried extract followed by crystallisation from methanol gave 5,6 diphenyl-2,3-dihydroimidazo[2,1-a]isoquinoline (m.p. 247°–9°C).

EXAMPLE 26

Using substantially the same method as described in Example 24, the following compounds were prepared:
5-(p-hydroxyphenyl)-2,3-dihydroimidazo[2,1-a] isoquinoline hydrochloride (m.p. above 360°C)
6,7-diphenyl-2H-3,4-dihydropyrimido[2,1-a]isoquinoline hydrochloride (m.p. 340°–342°C)

In the following Examples relating to pharmaceutical compositions the term "medicament" is used to indicate the compound 5,6-diphenyl-2,3-dihydroimidazo [2,1-a] isoquinoline.

This compound may of course be replaced in these compositions by any other compound of formula 1, for example by imidazo[1,2-c]quinazoline. Adjustments in the amount of medicament may be necessary or desirable depending on the degree of activity of the medicament used as is well known in the art.

EXAMPLE 27

|  | Mg./Tablet |
|---|---|
| Medicament | 15 |
| Lactose | 86 |
| Maize Starch (dried) | 45.5 |
| Gelatin | 2.5 |
| Magnesium stearate | 1.0 |

The medicament is powdered and passed through a B.S. No. 100 sieve, well mixed with lactose and part of the maize starch, and both passed through a B.S. No. 44 sieve.

The mixed powders are formed into a mass with a warm gelatin solution prepared by stirring the gelatin in water and heating to form a 10% W/W solution. The mass is granulated by passing through a B.S. No. 12 sieve and the minute granules dried at 40°C.

The dried granules are re-granulated by passing through a B.S. No. 14 sieve, the remainder of the starch sieved through a 44 mesh sieve and the magnesium stearate, sieved through a 60 mesh sieve, added and thoroughly mixed.

The granules are compressed to produce tablets each weighing 150 mg.

EXAMPLE 28 — Tablet Formulation

|  | Mg./Tablet |
|---|---|
| Medicament | 100 |
| Lactose | 39 |
| Maize starch (dried) | 80 |
| Gelatin | 4.0 |
| Magnesium stearate | 2.0 |

EXAMPLE 29

The method of preparation is the same as that in Example 16.

EXAMPLE 30 — Capsule Formulation

|  | Mg./Capsule |
|---|---|
| Medicament | 250 |
| Lactose | 150 |

The medicament and lactose is passed through a No. 44 B.S. sieve and the powder well mixed together before filling into hard gelatin capsules of suitable size - each to contain 400 mg. of mixed powder.

EXAMPLE 31 — Suppositories

|  | Mg./Suppository |
|---|---|
| Medicament | 50 |
| Oil of Theobroma | 950 |

The medicament is powdered and passed through a B.S. No. 100 sieve and triturated with molten oil of theobroma at 45°C to form a smooth suspension.

The mixture is well stirred and poured into moulds, each of nominal 1 G. capacity to produce suppositories.

EXAMPLE 32 — Cachets

|  | Mg./Cachet |
|---|---|
| Medicament | 100 |
| Lactose | 400 |

The medicament is passed through a B.S. No. 40 sieve, mixed with lactose previously sized 44 mesh and filled into cachets of suitable size each to contain 500 mg.

EXAMPLE 33 — Intramuscular Injection (Suspension in Aqueous Vehicle)

|  | Mg. |
|---|---|
| Medicament | 10 mg. |
| Sodium citrate | 5.7 mg. |
| Sodium carboxymethylcellulose (low viscosity) | 2.0 mg. |
| Methyl para-hydroxybenzoate | 1.5 mg. |
| Propyl para-hydroxybenzoate | 0.2 mg. |
| Water for injection | 1.0 ml. |

The sodium citrate and sodium carboxymethyl cellulose are mixed with sufficient water for injection at 80°C. The mixture is cooled to 50°C and the methyl- and propyl-para-hydroxybenzoates added followed by the medicament previously milled and sieved to 300 mesh. When cooled the injection is made up to volume and sterilised by heating in an autoclave.

We claim:

1. A 2,3-dihydroimidazo isoquinoline of formula VIa or a pharmaceutically acceptable acid addition salt thereof:

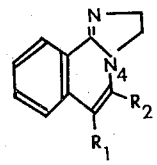

VIa wherein $R_1$ and $R_2$ independently represent a phenyl, hydroxyphenyl, alkylthiophenyl, or alkoxyphenyl group in which the alkoxy or alkyothio group has 1 to 4 carbon atoms or, in the case of $R_1$ only, hydrogen except that $R_1$ is other than phenyl when $R_2$ is hydrogen or $R_1$ and $R_2$ together represent a divalent radical joined to the isoquinoline nucleus to form a 2,3-dihydroimidazo phenanthridine of formula:

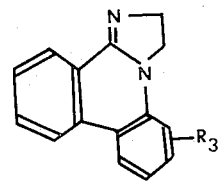

wherein $R_3$ represents a halogen or hydrogen.

2. 5,6-diphenyl-2,3-dihydroimidazo(2,1-a) isoquinoline.

3. The compound of claim 16 wherein the compound is specifically 2,3-dihydro-imidazo(1,2-f) phenanthridine.

4. The compound of claim 16 wherein the compound is specifically 7-bromo-2,3-dihydro-imidazo(1,2-f) phenanthridine.

5. The compound of claim 16 wherein the compound is specifically 5-phenyl-2,3-dihydroimidazo (2,1-a)-isoquinoline.

6. The compound of claim 16 wherein the compound is specifically 5-(p-hydroxyphenyl)-2,3-dihydroimidazo (2,1-a) isoquinoline.

* * * * *